US006253865B1

(12) United States Patent
Suzuki

(10) Patent No.: US 6,253,865 B1
(45) Date of Patent: Jul. 3, 2001

(54) DRIVING FORCE TRANSFER SYSTEM IN A HYBRID VEHICLE

(75) Inventor: Osamu Suzuki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/150,898

(22) Filed: Sep. 10, 1998

(30) Foreign Application Priority Data

Sep. 13, 1997 (JP) .................................................. 9-268015

(51) Int. Cl.[7] ................................. B60K 6/02; B60K 1/00
(52) U.S. Cl. ...................... 180/65.2; 180/65.7; 180/65.3; 180/165; 180/65.4
(58) Field of Search ................................. 180/65.2, 65.7, 180/65.6, 243, 165, 65.3, 65.4; 74/410; 475/5; 477/5

(56) References Cited

U.S. PATENT DOCUMENTS

| | | | |
|---|---|---|---|
| 5,193,634 | * | 3/1993 | Masut .................................. 180/65.2 |
| 5,327,987 | * | 7/1994 | Abdelmalek ........................ 180/65.2 |
| 5,460,235 | * | 10/1995 | Shimizu .............................. 180/79.1 |
| 5,697,466 | * | 12/1997 | Moroto et al. ...................... 180/65.2 |
| 5,823,280 | * | 10/1998 | Lateur et al. ....................... 180/65.2 |
| 5,931,271 | * | 8/1999 | Haka ................................... 180/65.2 |
| 5,970,930 | * | 10/1999 | Scheidt et al. ................... 123/90.17 |
| 6,032,755 | * | 3/2000 | Blandino et al. ................... 180/446 |

FOREIGN PATENT DOCUMENTS

| | | |
|---|---|---|
| 4128297 | 12/1992 | (DE) . |
| 0445873 | 9/1991 | (EP) . |
| 2494642 | 5/1982 | (FR) . |
| 2688174 | 9/1993 | (FR) . |
| 4-218430 | 8/1992 | (JP) . |
| 8-175476 | 7/1996 | (JP) . |
| 74057 | 1/1975 | (TW) . |
| 287991 | 10/1996 | (TW) . |
| 287992 | 10/1996 | (TW) . |

* cited by examiner

Primary Examiner—Michael Mar
Assistant Examiner—Hau Phan
(74) Attorney, Agent, or Firm—Birch, Stewart, Kolasch & Birch, LLP

(57) ABSTRACT

In a hybrid vehicle including an engine and a generator-motor as a drive source, a driving force transfer system is constituted by disposing a centrifugal clutch, a transmission and a one-way clutch in a driving force transfer path from the engine up to a driving force joining point where the driving force of the generator-motor and that of the engine join together. By switching the generator-motor into a motor, the vehicle can be moved forward by both the engine and the generator-motor. By switching the generator-motor into a generator, batteries can be charged while electric power is generated by the engine. The vehicle can be moved forward or backward by the generator-motor alone with the engine OFF. Thus, the vehicle can be moved backward using the generator-motor as a drive source, and batteries can be charged through the generator-motor using the engine as a drive source.

19 Claims, 9 Drawing Sheets

In Acceleration

In Deceleration

DRIVING FORCE TRANSFER SYSTEM IN A HYBRID VEHICLE

BACKGROUND OF THE INVENTION

1. Field of the Invention

The present invention relates to an improvement of a driving force transfer system in a hybrid vehicle.

2. Description of the Background Art

As a power system in a hybrid vehicle there is known, for example, "a hybrid propulsion system for a vehicle, especially for a streetcar" which is disclosed in Japanese Patent Laid Open No. 218430/92.

As shown in FIG. 1 of the unexamined publication, the above known system is provided with an internal combustion engine 10 and a motor 20. A driving force generated by the internal combustion engine 10 is transmitted to a shaft 16 through a belt 25 and a clutch 14, then from the shaft 16 it is transmitted to a vehicle wheel 26 through gears 17, 18 and a shaft 19. On the other hand, a driving force generated by the motor 20 is transmitted to the shaft 16 through a free wheel 24 which is a one-way clutch to assist the internal combustion engine 10.

However, in the prior art referred to above, since the driving force of the motor 20 is transmitted to the shaft 16 through the free wheel 24 (one-way clutch), it is impossible to transmit the driving force of the internal combustion engine 10 to the motor 20 side. Thus, the motor 20 cannot be used as a generator and it is impossible to charge batteries with use of the motor 20.

Nor is it possible to rotate the vehicle wheel 26 in the opposite direction with the motor 20 to move the vehicle backward.

SUMMARY OF THE INVENTION

It is therefore an object of the present invention to provide a driving force transfer system in a hybrid vehicle capable of moving the vehicle backward with use of a generator-motor as a drive source and also capable of charging batteries through the generator-motor with use an engine as a drive source.

In order to achieve the above-mentioned object, according to the present invention, in a hybrid vehicle including an engine and a generator-motor as a drive source, a driving force transfer system is constituted by disposing a centrifugal clutch, a transmission and a one-way clutch in a driving force transfer path from the engine up to a driving force joining point where the driving force from the generator-motor and that from the engine join together.

By switching the generator-motor into the motor, the vehicle is moved forward by the engine and the generator-motor, and by switching the generator-motor into the generator, batteries are charged while electric power is generated in the motor by the engine. Where required, the engine is stopped and the vehicle is moved forward or backward with the generator-motor alone.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
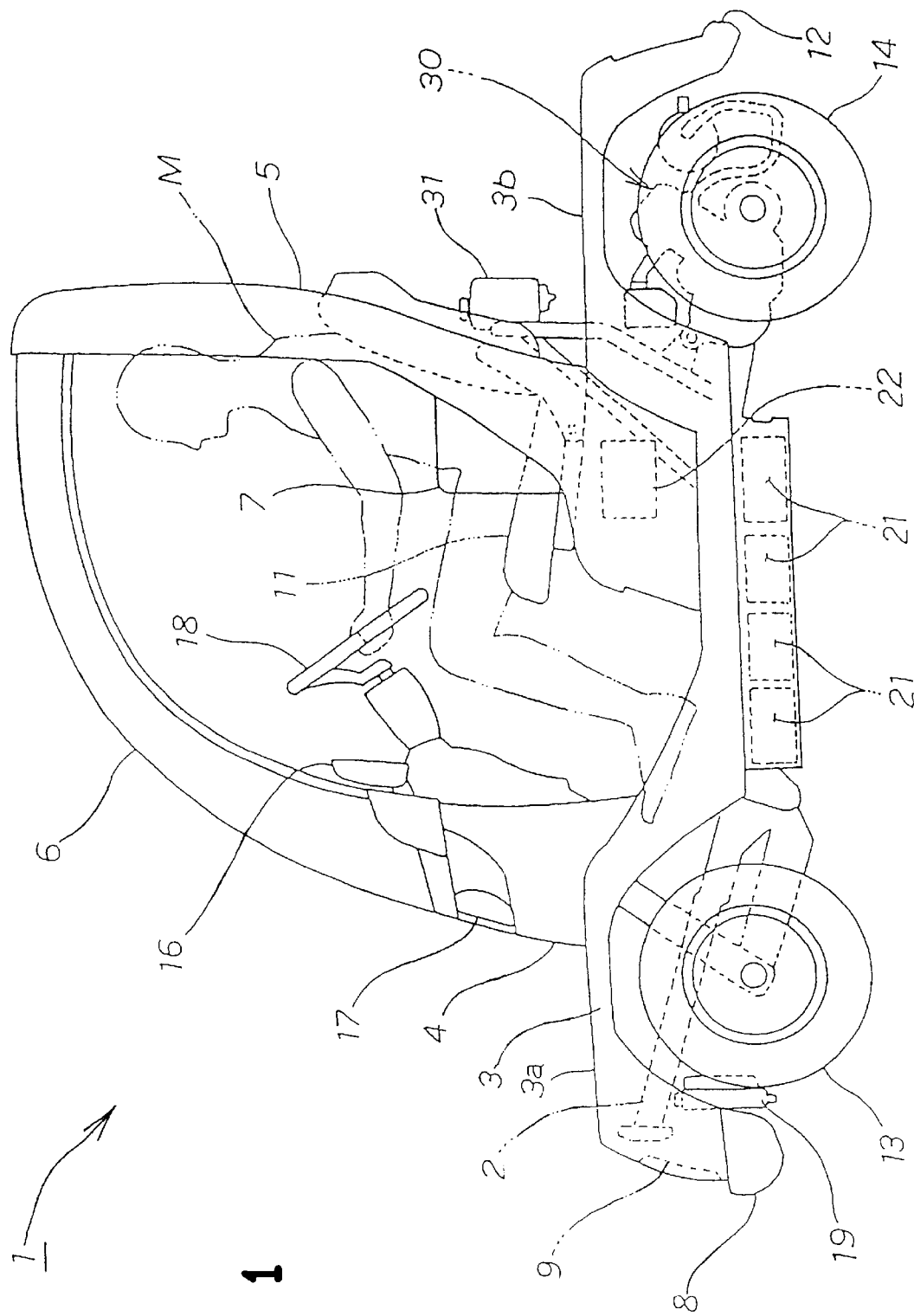
FIG. 1 is a side view of a hybrid vehicle according to the present invention.

An embodiment of the present invention will be described hereinunder with reference to the accompanying drawings. It is assumed that the drawings be viewed in the direction of the reference numerals.

FIG. 1 is a side view of a hybrid vehicle relating to the present invention. The hybrid vehicle, indicated at 1, comprises a vehicle body frame 2, a body 3 mounted to the body frame 2, a front cover 4 extending upward from a front central portion of the body 3, a center pillar 5 extending upward from a rear central portion of the body 3, a transparent roof 6 which provides a connection between the upper end of the center pillar 5 and the front cover 4, side protectors 7, 7 (the inner one is not shown) attached to both sides of the center pillar 5, a front bumper 8 mounted at the front of the body 3, a radiator grille 9 mounted just behind the front bumper 8, a driver's seat 11 mounted centrally in the interior of the body 3, a rear bumper 12 mounted behind the body 3, front wheels 13, 13 (the inner one is not shown) attached to the body frame 2, rear wheels 14, 14 (the inner one is not shown) as driving wheels attached to the body frame 2, side mirrors 16, 16 (the inner one is not shown) mounted on both sides of the transparent roof 6, lamps 17, 17 mounted on both sides of the front cover 4, a steering mechanism 18 mounted at the center of the body 3, a radiator 19 mounted behind the radiator grille 9, batteries 21 . . . (the dots . . . indicate a plural number, also in the following) carried centrally on the body frame 2, a control unit 22 disposed below the driver's seat 11, and a drive unit 30 mounted on the rear portion of the body frame 2. The mark M represents a driver.

Numeral 3a denotes a front deck portion and numeral 3b denotes a rear deck portion. One can get on the deck portions 3a and 3b and enter the driver's seat 11 easily through either of both deck portions.

Figure 2:
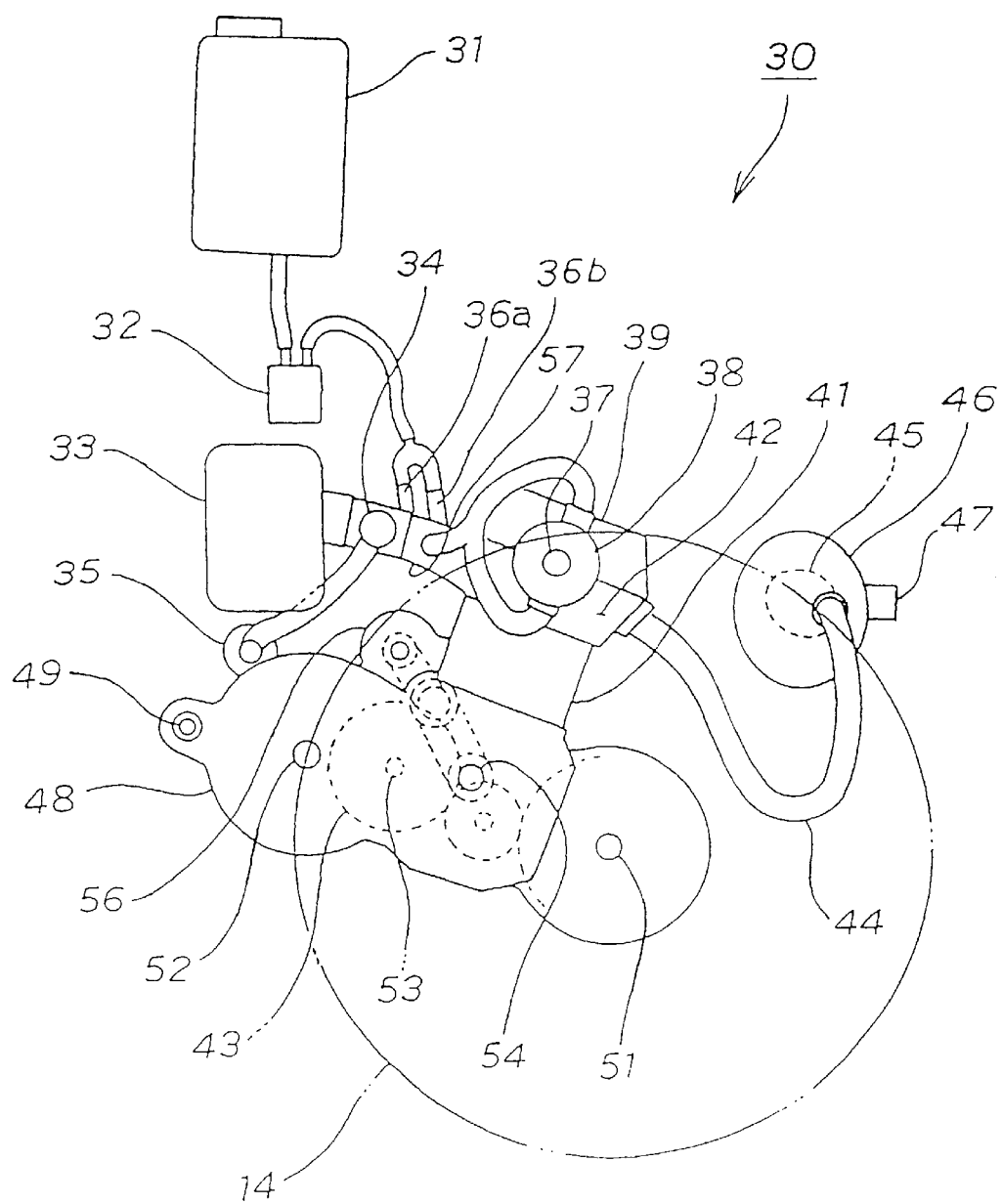
FIG. 2 is a side view of a driving system unit used in the hybrid vehicle.

FIG. 2 is a side view of the drive unit 30 used in the hybrid vehicle, showing principal components of the drive unit. More specifically, the numeral 31 denotes a fuel tank, numeral 32 denotes a fuel pump, numeral 33 an air cleaner, numeral 34 a throttle pulley, numeral 35 a servo motor, numeral 36a an injector for the supply of air-fuel mixture, numeral 36b a main injector, numeral 37 a cam shaft, numeral 38 a mechanical pump adapted to rotate integrally with the cam shaft 37, numeral 39 a head cover, numeral 41 a cylinder block, numeral 42 a cylinder head, numeral 43 a motor as a generator-motor, numeral 44 an exhaust pipe, numeral 45 a metal catalyst, numeral 46 a muffler, numeral 47 a tail pipe, numeral 48 a cone type continuously variable transmission, numeral 49 a pivot shaft, numeral 51 a rear axle, numeral 52 a continuously variable transmission shaft, numeral 53 a motor shaft serving as a driving force joining point, numeral 54 a crank shaft, numeral 56 a self-starting motor, and numeral 57 an intake manifold.

Figure 3:
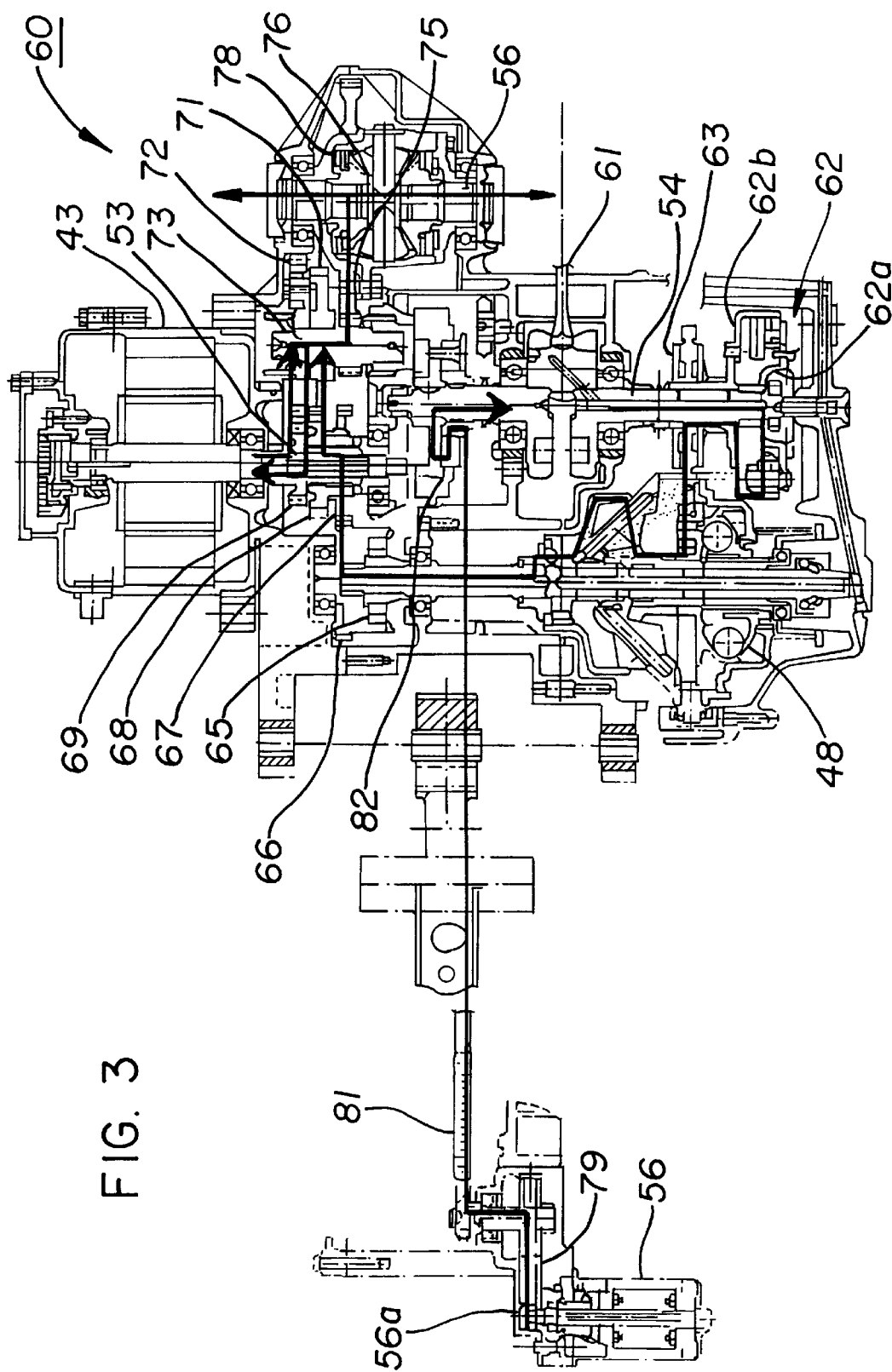
FIG. 3 is a sectional view of a driving force transfer system used in the hybrid vehicle.

FIG. 3 is a sectional view of a driving force transfer system in the hybrid vehicle according to the present invention. The driving force transfer system, indicated at 60, in the hybrid vehicle 1 (see FIG. 1) comprises an engine 61, an inner portion 62a of a centrifugal clutch 62 mounted on a crank shaft 54 of the engine 61, an outer portion 62b of the centrifugal clutch 62 for engagement with and disengagement from the inner portion 62a, a cone type continuously variable transmission 48 connected to the outer portion 62b through a torque limiter 63, a first transfer gear 66 connected to the cone type continuously variable transmission 48 through a one-way clutch 65, a motor 43 for driving the hybrid vehicle 1 (see FIG. 1) together with the engine 61, a motor shaft 53 serving as a driving force joining point, a second transfer gear 67 meshing with the first transfer gear 66 mounted on the motor shaft 53, an engine-side first helical gear 68 and a motor-side first helical gear 69 both mounted on the motor shaft 53, an engine-side second helical gear 71 and a motor-side second helical gear 72 meshing with the gears 68 and 69, respectively, a counter shaft 73 which supports the gears 71 and 72, pressure sensors 74a and 74b (see FIG. 8) mounted on both ends of the counter shaft 73, an output gear 75 mounted on the counter shaft 73, a propeller shaft 76 connected to the output gear 75, a rear axle 51 connected to the propeller shaft 76 through a differential 78, and a rear wheel 14 (see FIG. 1) secured to the rear axle 51.

The self-starter motor 56 causes a motor shaft 56a thereof to rotate the crank shaft 54 through a belt 79, a chain 81 and one-way clutch 82.

Figure 4:
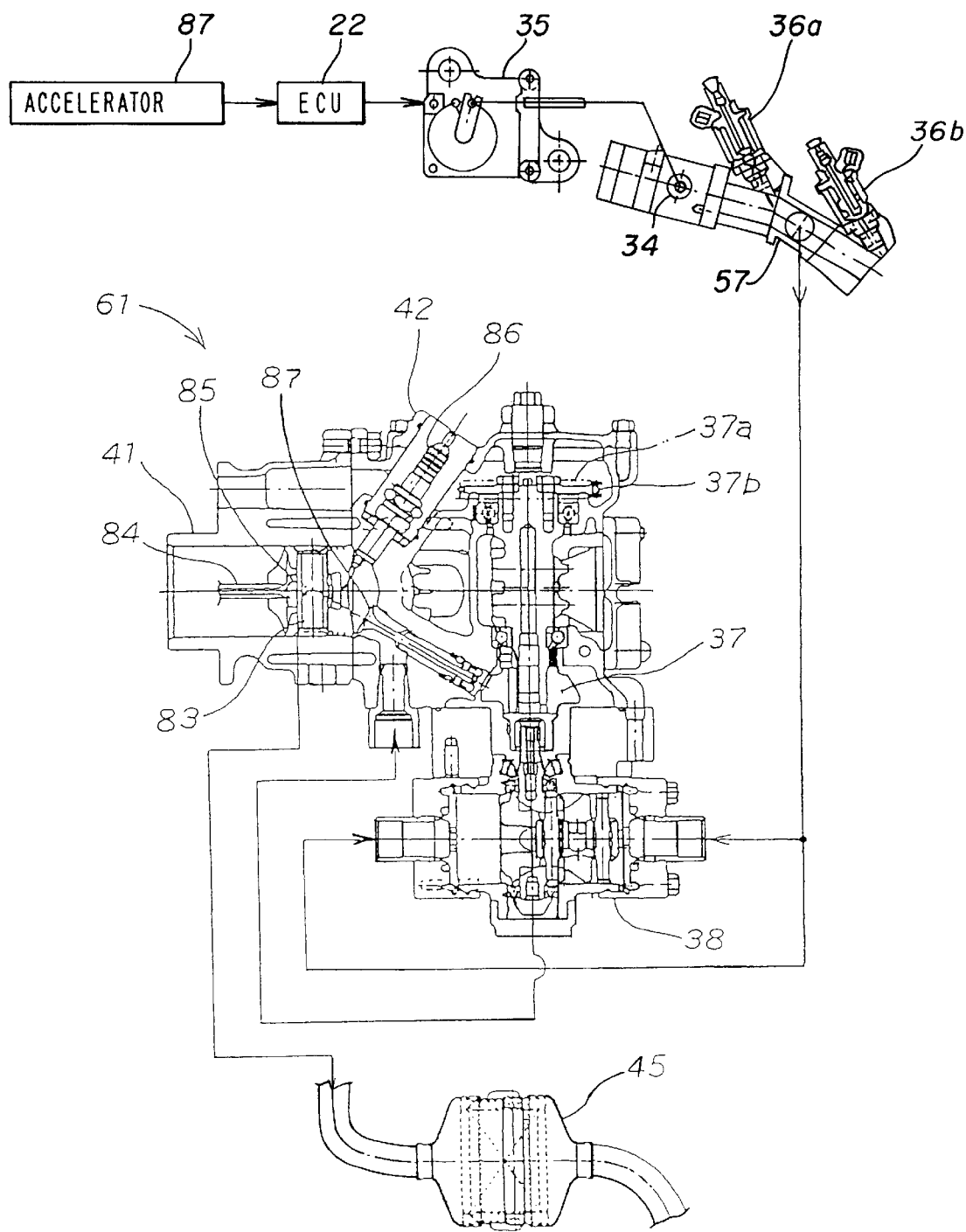
FIG. 4 is a sectional view of an engine used in the hybrid vehicle.

FIG. 4 is a sectional view of the engine used in the hybrid vehicle. The engine 61 comprises a cylinder block 41, a piston 83 which reciprocates through the cylinder block 41, a connecting rod 84 secured to the piston 83, a cylinder head 42 applied to the cylinder block 41, an auxiliary intake valve 87 and an exhaust valve 85 formed in the cylinder head 42, and a spark plug 86 attached to the cylinder head 42. A mechanical pump 38 is adapted to rotate coaxially with the cam shaft 37. Numerals 37a and 37b denote a cam chain and a cam sprocket, respectively.

In accordance with the opening of an accelerator 87 the throttle pulley 34 is adjusted through the control unit 22 and the servo motor 35, thereby adjusting the amount of air-fuel mixture to be fed to control the output of the engine 61.

When there is a request for engine output during running of the motor alone and during opening of the accelerator 87, the throttle pulley 34 is closed with the servo motor 35 to make start-up of the engine 61 better irrespective of the accelerator opening.

On the other hand, a portion of the air-fuel mixture fed from the injector 36a branches from the intake manifold 57 and is pumped by the mechanical pump 38 into the cylinder block 41 from the auxiliary intake valve 87 just before ignition, thereby improving the engine output.

Figure 5A:
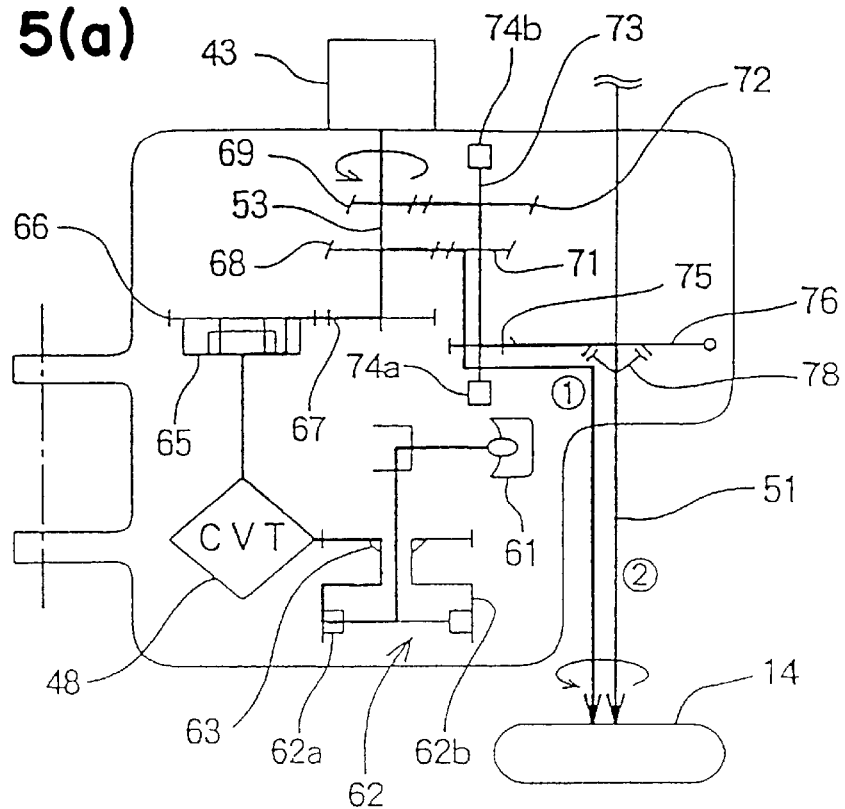
FIG. 5 is a first operation explaining diagram of the driving force transfer system.

The operation of the driving force transfer system 60 in the hybrid vehicle 1 (see FIG. 1) described above will be explained below with reference to FIGS. 5 to 7. FIGS. 5(a) and (b) are first operation explaining diagrams of the driving force transfer system according to the present invention. FIG. 5(a) shows a situation where the rear wheel 14 is driven with a combined force of both the engine 61 and motor 43. The engine 61 drives the rear wheel 14 as illustrated by the arrow ① successively via the inner portion 62a and outer portion 62b of the centrifugal clutch 62, the cone type continuously variable transmission 48, one-way clutch 65, first transfer gear 66, second transfer gear 67 and engine-side first and second helical gears 68, 69 which are mounted on the motor shaft 53 as a joining point of the engine-motor driving forces, further via the output gear 75, propeller shaft 76, differential 78 and rear axle 51.

On the other hand, the motor 43 drives the rear wheel 14 as illustrated by the arrow ② successively via the motor shaft 53, motor-side first and second helical gears 69, 72, output gear 75, propeller shaft 76, differential 78 and rear axle 51.

The driving force of the engine 61 and that of the motor 43 are combined together at the motor shaft 53. When the hybrid vehicle 1 (see FIG. 1) is to be started with the engine 61, the vehicle can be started by smooth and gradual transfer of torque through the centrifugal clutch 62. Since the centrifugal clutch 62 is disposed before the cone type continuously variable transmission 48, a smaller clutch capacity is necessary than when the clutch is disposed after the transmission 48. Conversely, when viewed from the cone type continuously variable transmission 48 side, the arrangement provides protection for the transmission 48 because the transmission does not directly undergo an excessive torque of the engine 61. Particularly, where the clutch is used as a wet clutch, the contact pressure is small. Therefore, a larger clutch capacity is necessary if the centrifugal clutch 62 is disposed after the transmission 48, resulting in an increase in size of the system.

Since the cone type continuously variable transmission 48 is connected to the outer portion 62a of the centrifugal clutch 62 through the torque limiter 63, a back torque from the rear wheel 14 to the engine can be avoided.

Figure 5B:
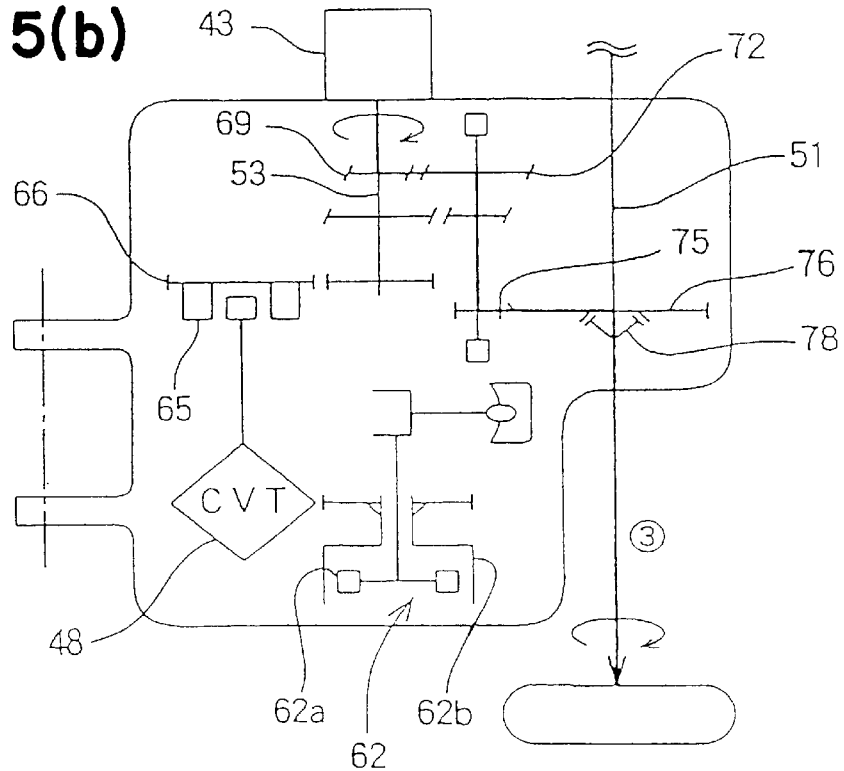

FIG. 5(b) shows a situation where the rear wheel 14 is driven with only the motor 43. The motor 43 drives the rear wheel 14 as illustrated by the arrow ③ successively via the motor shaft 53, motor-side first and second helical gears 69, 72, output gear 75, propeller shaft 76, differential 78 and rear axle 51.

With the engine 61 OFF, the one-way clutch is open. Since the one-way clutch 65 is disposed just before the engine-motor driving force joining point, when the rear wheel 14 is driven with the motor 43 alone, follow-up rotation of the load-side transmission 48 and the centrifugal clutch outer portion 62b does not occur. Consequently, it is possible to conserve battery consumption, resulting in a longer operation time.

Figure 6A:
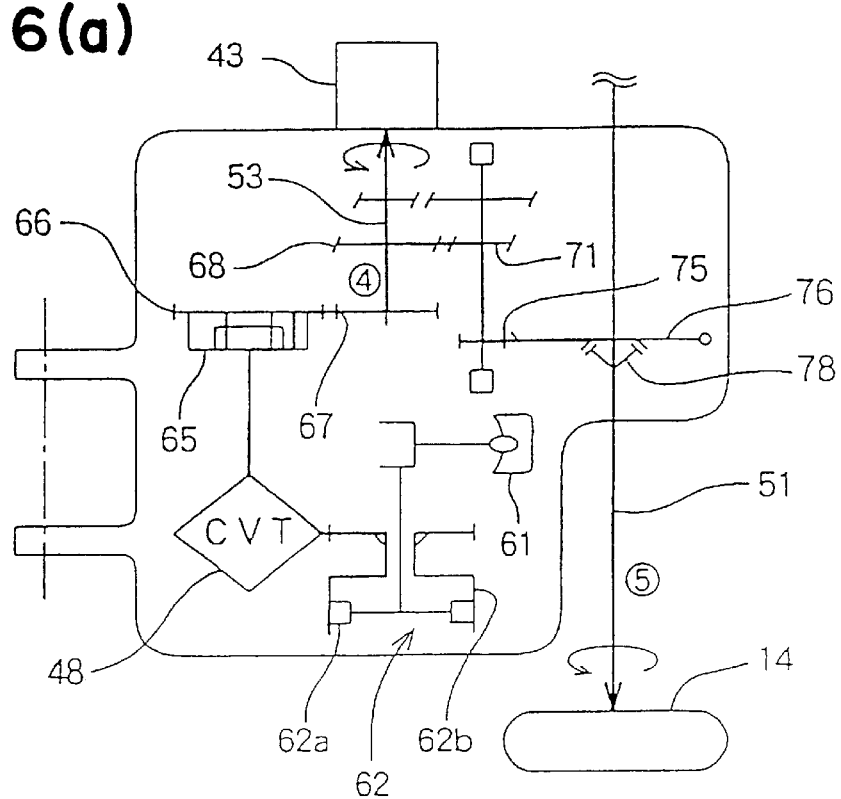
FIG. 6 is a second operation explaining diagram of the driving force transfer system.

FIGS. 6(a) and (b) are second operation explaining diagrams of the driving force transfer system according to the present invention. FIG. 6(a) shows a situation where the rear wheel 14 is driven with only the engine 61.

The engine 61 drives the motor shaft 53 as illustrated by the arrow ④ successively via inner portion 62a and outer portion 62b of the centrifugal clutch 62, cone type continuously variable transmission 48, one-way clutch 65, first transfer gear 66 and second transfer gear 67. Thus, it is possible to let the motor 43 operate as a generator to charge the batteries (see FIG. 1).

Further, the engine 61 drives the rear wheel 14 as illustrated by the arrow ⑤ successively via the engine-side first and second helical gears 68, 71, output gear 75, propeller shaft 76, differential 78 and rear axle 51.

Figure 6B:
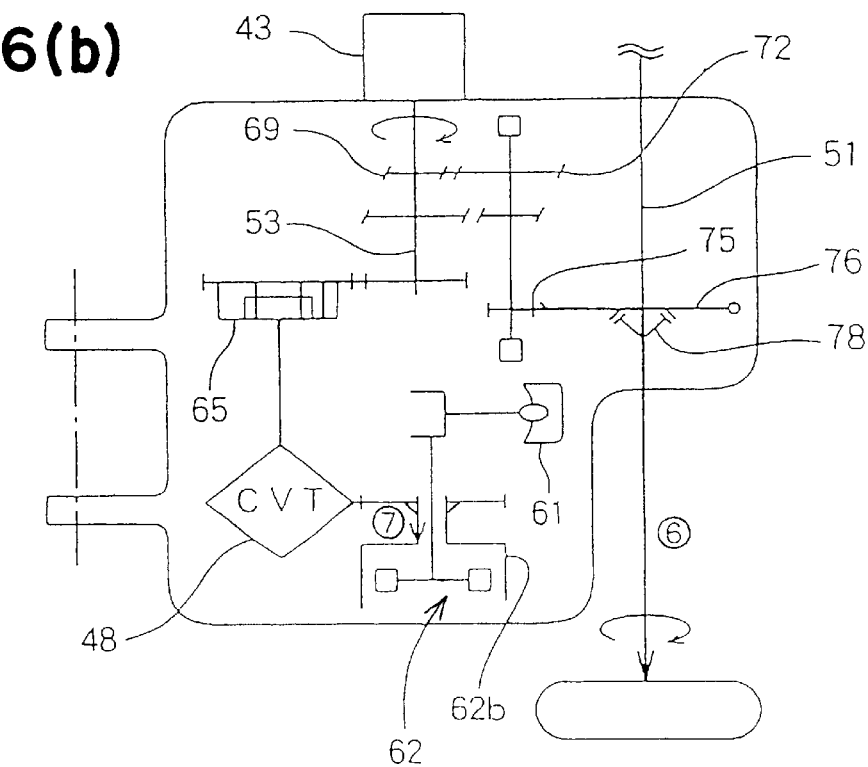

FIG. 6(b) shows a situation where the hybrid vehicle 1 (see. FIG. 1) is moved backward with the motor 43. The motor 43 is rotated in a reverse manner and the rotating force is transmitted to the rear wheel 14 as illustrated by the arrow ⑥ successively via the motor shaft 53, motor-side first and second helical gears 69, 72, output gear 75, propeller shaft 76, differential 78 and rear axle 51 to rotate the rear wheel in the reverse direction.

Although the engine 61 is OFF, the motor 43 is rotating in the reverse direction. Therefore, the one-way clutch 65 is engaged and the driving force of the motor 43 is transmitted to the cone type continuously variable transmission 48 and the outer portion 62b of the centrifugal clutch 62 as illustrated by the arrow ⑦. However, no follow-up rotation of the engine 61 by the centrifugal clutch 62 occurs.

Figure 7:
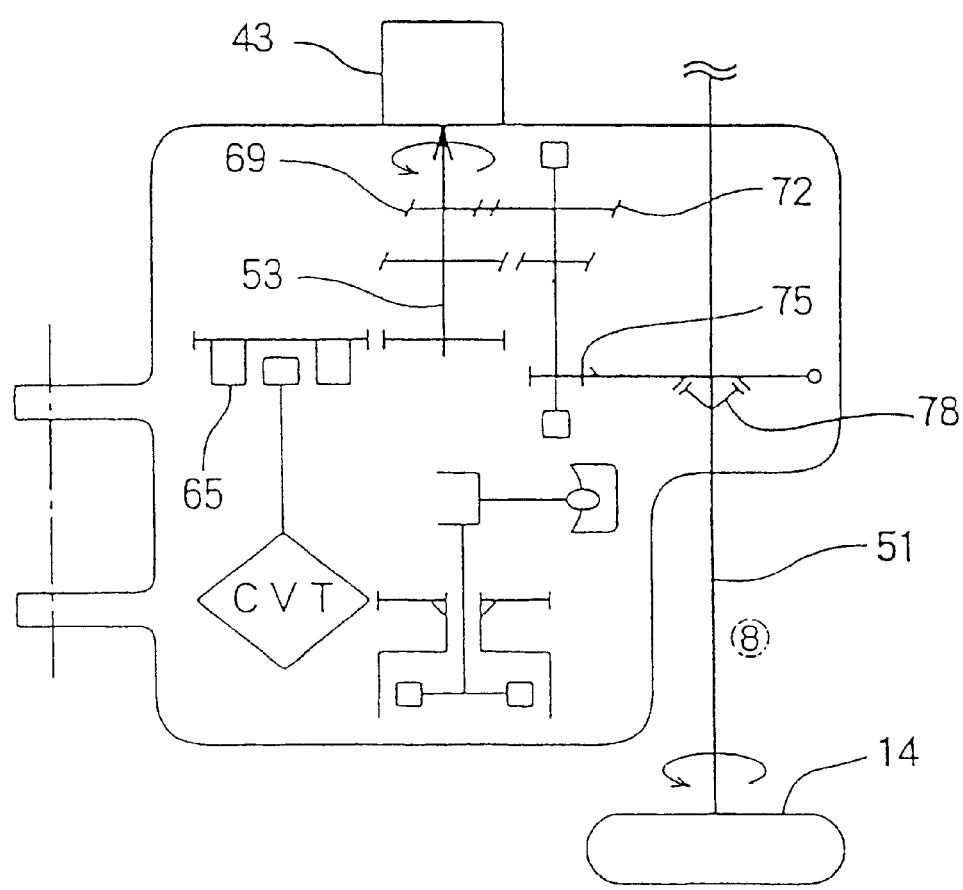
FIG. 7 is a third operation explaining diagram of the driving force transfer system.

FIG. 7 is a third operation explaining diagram of the driving force transfer system according to the present invention, showing a driving force flow at the time of deceleration of the hybrid vehicle 1 (see FIG. 1).

In deceleration of the hybrid vehicle 1 (see FIG. 1), a decelerating drive force is transmitted to the motor 43 as illustrated by the arrow ⑧ successively via the rear wheel 14, rear axle 51, differential 78, propeller shaft 76, motor-side second and first helical gears 72, 69, and motor shaft 53. The motor 43 operates as a generator. At this time, the one-way clutch 65 becomes open, the decelerating drive force can be transmitted effectively to the motor 43, whereby the batteries 21 (see FIG. 1) can be charged.

Figure 8:
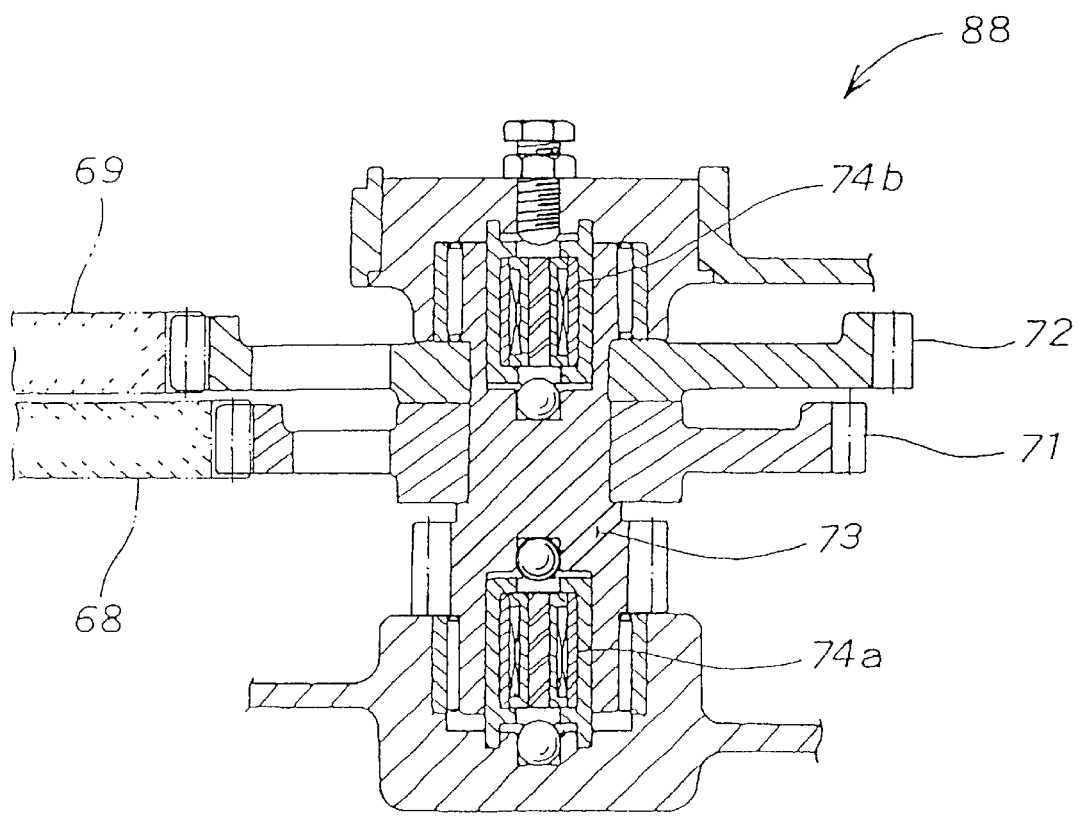
FIG. 8 is a sectional view of a torque sensor unit used in the driving force transfer system.

FIG. 8 is a sectional view of a torque sensor unit used in the driving force transfer system according to the present invention. The torque sensor unit 88 comprises the counter shaft 73 referred to previously, pressure sensors 74a and 74b mounted on both sides of the counter shaft 73, engine-side second helical gear 71 and motor-side second helical gear 72 both mounted on the counter shaft 73, engine-side first helical gear 68 and motor-side first helical gear 69 which are in mesh with the gears 71 and 72, respectively.

Figure 9A:
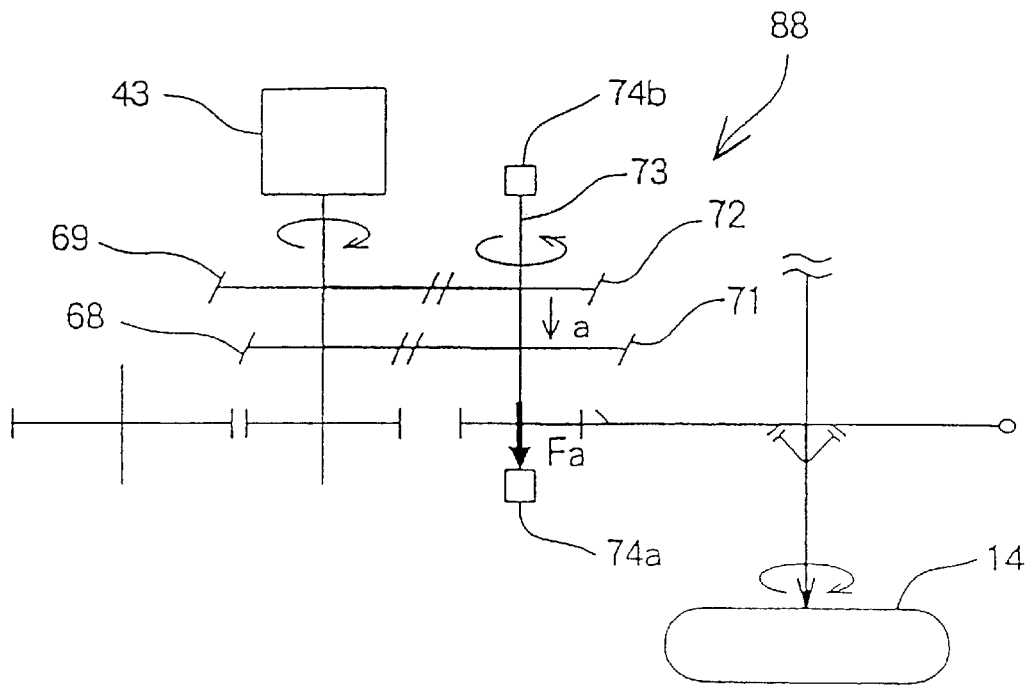
FIG. 9 is an operation explaining diagram of the torque sensor unit.

The operation of the torque sensor unit 88 will be described below with reference to the following figures. FIGS. 9(a) and (b) are explanatory views explaining the operation of the torque sensor unit. FIG. 9(a) shows the operation of the torque sensor unit 88 during acceleration.

During acceleration, the driving force from the engine 61 (see FIG. 3) or from the motor 43 side is transmitted to the rear wheel 14. That is, the engine side first helical gear 68 and the motor-side first helical gear 69 serve as the driving side, while the engine-side second helical gear 71 and the motor-side second helical gear 72 serve as the driven side, so that the gears 71 and 72 give rise to a stress Fa in the counter shaft 73 as illustrated by the arrow "a". The stress Fa is detected by the pressure sensor 74a.

Figure 9B:
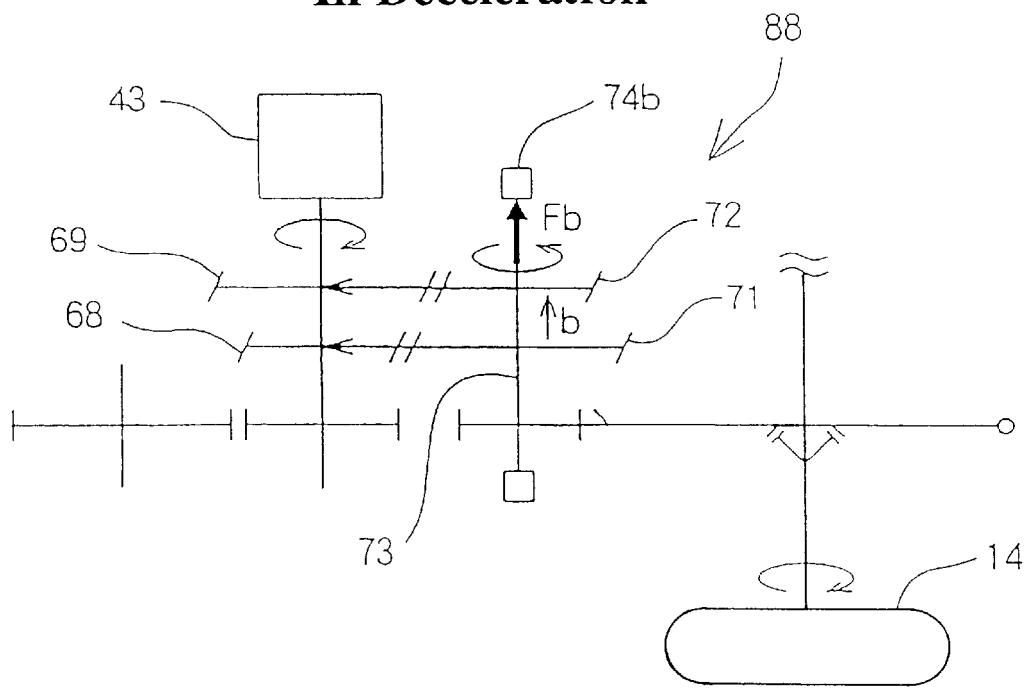

FIG. 9(b) shows the operation of the torque sensor unit 88 in deceleration. During deceleration, a driving force is transmitted from the rear wheel 14 side to the motor 43 side. That is, the engine-side second helical gear 71 and the motor-side second helical gear 72 serve as the driving side, while the engine-side first helical gear 68 and the motor-side first helical gear 69 serve as the driven side, so that the gears 68 and 69 give rise to a stress Fb in the counter shaft 73 as illustrated by the arrow "b". The stress Fb is detected by the pressure sensor 74b.

Thus, the magnitude of driving force and the direction of transfer are detected by the pressure sensors 74a and 74b, followed by a feedback control, and they are combined with the driving force of the engine 61 or the motor 43 (see FIG. 2) as a drive source, whereby the hybrid vehicle 1 (see FIG. 1) cab be driven efficiently.

Since the torque sensor unit 88 is composed of the counter shaft 73, pressure sensors 74a and 74b mounted on both ends of the counter shaft 73, engine-side second helical gear 71 and motor-side second helical gear 72 both mounted on the counter shaft 73, and engine-side first helical gear 68 and motor-side first helical gear 69 meshing with the gears 71 and 72, respectively, it is possible to realize a compact and highly reliable torque detecting mechanism.

Since the present invention is constructed as above, the following effects are attained. According to the present invention, by switching the generator-motor into a motor, the vehicle can be moved forward by both engine and generator-motor. By switching the generator-motor into a generator, the batteries can be charged while electric power is generated by the engine. If necessary, the vehicle can be moved forward or backward by only the generator-motor with the engine OFF. Using the generator-motor as a drive source, the vehicle can be moved backward, and using the engine as a drive source, the batteries can be charged through the generator motor. Therefore, the use of the hybrid vehicle becomes more convenient.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. In a hybrid vehicle including an engine and a generator-motor as a drive source, a driving force transfer system comprising:
   a centrifugal clutch;
   a transmission; and
   a one-way clutch, wherein the centrifugal clutch, the transmission and the one-way clutch are disposed in a driving force transfer path from the engine to a driving force joining point where a driving force directly transmitted from the generator-motor and a driving force transmitted from the engine through said centrifugal clutch, said transmission and said one-way clutch join together.

2. The driving force transfer system according to claim 1, wherein when the one-way clutch is in an open position, and the engine is OFF, the vehicle is driven by the generator-motor alone.

3. The driving force transfer system according to claim 1, wherein when the vehicle is driven by the engine alone, a driving force of the engine is transferred to the generator-motor to charge batteries of the vehicle.

4. The driving force transfer system according to claim 1, wherein the driving force driving point comprises:
   first and second engine side helical gears;
   first and second generator-motor side helical gears;
   a first pressure sensor for detecting a stress on the second engine side helical gear and the second generator-motor side helical gear; and
   a second pressure sensor for detecting a stress on the first engine side helical gear and the first generator-motor side helical gear,
   wherein the first pressure sensor detects a stress when a rear wheel of the vehicle is being driven, and the second pressure sensor detects a stress when the rear wheel of the vehicle is being decelerated.

5. A driving force transfer system for a hybrid vehicle comprising:
- a centrifugal clutch for receiving a driving force from an engine of the vehicle;
- a transmission for receiving the engine driving force from the centrifugal clutch;
- a one-way clutch for receiving the engine driving force from the transmission; and
- a driving force joining point for receiving the engine driving force from the one-way clutch and a motor driving force from a motor of the vehicle,
- wherein the driving force from the motor and the driving force from the engine are joined together at the driving force joining point.

6. The driving force transfer system according to claim 5, wherein when the one-way clutch is in an open position, and the engine is OFF, the vehicle is driven by the motor alone.

7. The driving force transfer system according to claim 5, wherein when the vehicle is driven by the engine alone, a driving force of the engine is transferred to the motor to charge batteries of the vehicle.

8. The driving force transfer system according to claim 5, said driving force driving point further comprising:
- first and second engine side helical gears;
- first and second motor side helical gears;
- a first pressure sensor for detecting a stress on the second engine side helical gear and the second motor side helical gear; and
- a second pressure sensor for detecting a stress on the first engine side helical gear and the first motor side helical gear,
- wherein the first pressure sensor detects a stress when a rear wheel of the vehicle is being driven, and the second pressure sensor detects a stress when the rear wheel of the vehicle is being decelerated.

9. A hybrid vehicle comprising:
- an engine for driving wheels of the vehicle;
- a motor for driving wheels of the vehicle; and
- a driving force transfer system, said driving force transfer system comprising:
  - a centrifugal clutch for receiving a driving force from the engine of the vehicle;
  - a transmission for receiving the engine driving force from the centrifugal clutch;
  - a one-way clutch for receiving the engine driving force from the transmission; and
  - a driving force joining point for receiving the engine driving force from the one-way clutch and a motor driving force from the motor of the vehicle,
  - wherein the driving force from the motor and the driving force from the engine are joined together at the driving force joining point.

10. The hybrid vehicle according to claim 9, wherein when the one-way clutch is in an open position, and the engine is OFF, the vehicle is driven by the motor alone.

11. The hybrid vehicle according to claim 9, wherein when the vehicle is driven by the engine alone, a driving force of the engine is transferred to the motor to charge batteries of the vehicle.

12. The hybrid vehicle according to claim 9, said driving force driving point further comprising:
- first and second engine side helical gears;
- first and second motor side helical gears;
- a first pressure sensor for detecting a stress on the second engine side helical gear and the second motor side helical gear; and
- a second pressure sensor for detecting a stress on the first engine side helical gear and the first motor side helical gear,
- wherein the first pressure sensor detects a stress when the wheels of the vehicle are being driven, and the second pressure sensor detects a stress when the wheels of the vehicle are being decelerated.

13. The hybrid vehicle according to claim 12, further comprising:
- an output gear for receiving the driving forces of the engine and the motor from the second engine side helical gear and the second motor side helical gear;
- a propeller shaft for receiving the driving forces of the engine and the motor from the output gear;
- a differential for receiving the driving forces of the engine and the motor from the propeller shaft; and
- an axle for receiving the driving forces of the engine and the motor from the differential and for driving the wheels of the vehicle.

14. In a hybrid vehicle including an engine and a generator-motor as a drive source, a driving force transfer system comprising:
- a centrifugal clutch;
- a transmission; and
- a one-way clutch, wherein the centrifugal clutch, the transmission and the one-way clutch are disposed in a driving force transfer path from the engine to a driving force joining point where a driving force from the generator-motor and a driving force from the engine loin together; and
- wherein said centrifugal clutch, said transmission and said one-way clutch are located between said engine and said driving force joining point along said driving force transfer path, said transmission being located between said centrifugal clutch and said one-way clutch.

15. The driving force transfer system according to claim 5, wherein said centrifugal clutch, said transmission and said one-way clutch are located between a location of the driving force from the engine and said driving force joining point, said transmission being located between said centrifugal clutch and said one-way clutch.

16. The hybrid vehicle according to claim 9, wherein said centrifugal clutch, said transmission and said one-way clutch are located between said engine and said driving force joining point, said transmission being located between said centrifugal clutch and said one-way clutch.

17. The driving force transfer system according to claim 1, wherein the driving force is transmitted from said engine to said centrifugal clutch, to said transmission, and then to said one-way clutch.

18. The driving force transfer system according to claim 1, wherein the driving force from said engine is transmitted directly from said transmission to said one-way clutch.

19. The driving force transfer system according to claim 1, wherein the driving force from said engine is transmitted directly from said centrifugal clutch to said transmission.

* * * * *